United States Patent
Taghavi et al.

(10) Patent No.: US 11,410,388 B1
(45) Date of Patent: Aug. 9, 2022

(54) DEVICES, SYSTEMS, METHODS, AND MEDIA FOR ADAPTIVE AUGMENTATION FOR A POINT CLOUD DATASET USED FOR TRAINING

(71) Applicants: Ehsan Taghavi, Markham (CA); Yuan Ren, Thornhill (CA); Bingbing Liu, Markham (CA)

(72) Inventors: Ehsan Taghavi, Markham (CA); Yuan Ren, Thornhill (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/203,407

(22) Filed: Mar. 16, 2021

(51) Int. Cl.
*G06T 17/20* (2006.01)
*G06N 20/00* (2019.01)
*G06K 9/62* (2022.01)
*G06T 19/20* (2011.01)

(52) U.S. Cl.
CPC .......... *G06T 17/205* (2013.01); *G06K 9/6256* (2013.01); *G06N 20/00* (2019.01); *G06T 19/20* (2013.01)

(58) Field of Classification Search
CPC ..... G06T 17/205; G06T 19/20; G06K 9/6256; G06N 20/00
See application file for complete search history.

(56) References Cited

U.S. PATENT DOCUMENTS

| | | | |
|---|---|---|---|
| 2020/0012943 A1 | 1/2020 | Neves et al. | |
| 2020/0082640 A1 | 3/2020 | Fang et al. | |
| 2020/0193222 A1 | 6/2020 | Singh et al. | |
| 2021/0150807 A1* | 5/2021 | Zhou | G06N 3/0454 |
| 2021/0197720 A1* | 7/2021 | Houston | B60Q 9/008 |
| 2021/0284184 A1* | 9/2021 | Song | G06N 3/0454 |
| 2021/0366205 A1* | 11/2021 | Juppe | G06K 9/6256 |

FOREIGN PATENT DOCUMENTS

| | | |
|---|---|---|
| WO | 2020163455 A1 | 8/2020 |
| WO | 2021009258 A1 | 1/2021 |

OTHER PUBLICATIONS

Behley, J. et al., "SemanticKITTI: A Dataset for Semantic Scene Understanding of LiDAR Sequences", 2019 IEEE/CVF International Conference on Computer Vision (ICCV), Seoul, Korea (South), 2019, pp. 9296-9306, doi: 10.1109/ICCV.2019.00939.

(Continued)

*Primary Examiner* — Nurun Flora

(57) ABSTRACT

Devices, systems, methods, and media are described for adaptive scene augmentation of a point cloud frame for inclusion in a labeled point cloud dataset used for training a machine learned model for a prediction task for point cloud frames, such as object detection or segmentation. A formal method is described for generating new point cloud frames based on pre-existing annotated large-scale labeled point cloud frames included in a point cloud dataset to generate new, augmented point cloud frames. A policy is generated for large-scale data augmentation using detailed quantitative metrics such as confusion matrices. The policy is a detailed and stepwise set of rules, procedures, and/or conditions that may be used to generate augmented data specifically targeted to mitigate the existing inaccuracies in the trained model. The augmented point cloud frames may then be used to further train the model to improve the prediction accuracy of the model.

20 Claims, 5 Drawing Sheets

(56) References Cited

OTHER PUBLICATIONS

Xie, J. et al., "Semantic Instance Annotation of Street Scenes by 3D to 2D Label Transfer", 2016 IEEE Conference on Computer Vision and Pattern Recognition (CVPR), Las Vegas, NV, USA, 2016, pp. 3688-3697, doi: 10.1109/CVPR.2016.401.
Caesar, H. et al., "nuScenes: A multimodal dataset for autonomous driving", 2020 IEEE/CVF Conference on Computer Vision and Pattern Recognition (CVPR), Seattle, WA, USA, 2020, pp. 11618-11628, doi: 10.1109/CVPR42600.2020.01164.
Li, R. et al., "PointAugment: an Auto-Augmentation Framework for Point Cloud Classification", 6377-6386. 10.1109/CVPR42600.2020.00641, (2020).
Cheng, S. et al., "Improving 3D Object Detection through Progressive Population Based Augmentation", arXiv, abs/2004.00831, (2020).
Hataya, R. et al., "Faster AutoAugment: Learning Augmentation Strategies using Backpropagation", arXiv:1911.06987v1 [cs.CV] Nov. 16, 2019.
Lang, A. H. et al., "PointPillars: Fast Encoders for Object Detection from Point Clouds", arXiv:1812.05784v2 [cs.LG] May 7, 2019.
Lim, S. et al., "Fast AutoAugment", arXiv:1905.00397v2 [cs.LG] May 25, 2019.
Qi, C. R et al., "PointNet: Deep Learning on Point Sets for 3D Classification and Segmentation", arXiv: 1612.00593v2 [cs.CV] Apr. 10, 2017.
Tian, K. et al., "Improving Auto-Augment via Augmentation-Wise Weight Sharing", arXiv:2009.14737v2 [cs.LG] Oct. 22, 2020.
Zhang, X., "Adversarial AutoAugment", arXiv:1912.11188v1 [cs.CV] Dec. 24, 2019.

\* cited by examiner

DEVICES, SYSTEMS, METHODS, AND MEDIA FOR ADAPTIVE AUGMENTATION FOR A POINT CLOUD DATASET USED FOR TRAINING

RELATED APPLICATION DATA

This is the first patent application related to this matter.

FIELD

The present application generally relates to data augmentation for machine learning, and in particular to devices, systems, methods, and media for adaptive augmentation of point cloud frames used for training models for prediction tasks such as segmentation and object detection.

BACKGROUND

Light Detection And Ranging (LiDAR, also referred to a "Lidar" or "LIDAR" herein) sensor generates point cloud data representing a three-dimensional (3D) environment (also called a "scene") scanned by the LIDAR sensor. A single scanning pass of the LIDAR sensor generates a "frame" of point cloud data (referred to hereinafter as a "point cloud frame"), consisting of a set of points scanned by the lasers from one or more points in space, within a time period representing the time it takes the LIDAR sensor to perform one scanning pass. Some LIDAR sensors, such as spinning scanning LiDAR sensors, include a laser array that emits light in an arc and the LIDAR sensor rotates around a single location to generate a point cloud frame; other LiDAR sensors, such as solid-state LIDARs, emit light from one or more locations and integrate the reflected light from each location together to form a point cloud frame. Each laser in the laser array is used to generate multiple points per scanning pass, and each point corresponds to an object reflecting light emitted by the laser at a point in space in the environment. Each point is typically stored as a set of spatial coordinates (X, Y, Z) as well as other data indicating values such as intensity (i.e. the degree of reflectivity of the object reflecting the laser). The other data may be represented as an array of values in some implementations. In a spinning scanning LIDAR sensor, the Z axis of the point cloud frame is typically defined by the axis of rotation of the spinning scanning LIDAR sensor, roughly orthogonal to an azimuth direction of each laser in most cases (although some LIDAR sensors may angle some of the lasers slightly up or down relative to the plane orthogonal to the axis of rotation).

Point cloud frames may also be generated by other scanning technologies, such as high-definition radar, and theoretically any technology using scanning beams of energy, such as electromagnetic or sonic energy, could be used to generate point cloud data.

LIDAR sensor is one of the primary sensors used in autonomous vehicles to sense an environment (i.e. scene) surrounding the autonomous vehicle. An autonomous vehicle generally includes an automated driving system (ADS) or advanced driver-assistance system (ADAS) include a perception subsystem that processes point cloud frames to generate predictions which are usable by other modules or subsystems of the ADS or ADAS for localization of the autonomous vehicle, path planning for the autonomous vehicle, motion planning for the autonomous vehicle, or trajectory generation for the autonomous vehicle. However, because of the sparse and unordered nature of point cloud frames, the cost of collecting and labeling point cloud frames at the point level is time consuming and expensive. Points in a point cloud frame must be clustered, segmented, or grouped (e.g., using object detection, semantic segmentation, instance segmentation, or panoptic segmentation) such that a collection of points in the point cloud frame may be labeled with an object class (e.g., "pedestrian" or "motorcycle") or an instance of an object class (e.g. "pedestrian #3"), with these labeled point cloud frames being used to train models for predictions tasks, such as object detection or various types of segmentation. This cumbersome process of labeling point cloud frames has resulted in limited availability of labeled point cloud frames representing various road and traffic scenes, which are needed to train high accuracy models for predictions tasks using machine learning.

Examples of labeled point cloud datasets that include point cloud frames that are used to train models using machine learning for prediction tasks, such as segmentation and objection detection, are SemanticKITTI dataset (described by J. Behley et al., "SemanticKITTI: A Dataset for Semantic Scene Understanding of LiDAR Sequences," 2019 IEEE/CVF International Conference on Computer Vision (ICCV), Seoul, Korea (South), 2019, pp. 9296-9306, doi: 10.1109/ICCV.2019.00939), the KITTI360 dataset (described by J. Xie, M. Kiefel, M. Sun and A. Geiger, "Semantic Instance Annotation of Street Scenes by 3D to 2D Label Transfer," 2016 IEEE Conference on Computer Vision and Pattern Recognition (CVPR), Las Vegas, Nev., USA, 2016, pp. 3688-3697, doi: 10.1109/CVPR.2016.401.), and the Nuscenes-lidarseg dataset (described by H. Caesar et al., "nuScenes: A Multimodal Dataset for Autonomous Driving," 2020 IEEE/CVF Conference on Computer Vision and Pattern Recognition (CVPR), Seattle, Wash., USA, 2020, pp. 11618-11628, doi: 10.1109/CVPR42600.2020.01164.), which may be the only available datasets of point cloud frames with semantic information, i.e. point cloud frames labeled with semantic data for training models for prediction tasks, such as segmentation and object detection.

However, these available labeled point cloud datasets generally do not include enough point cloud frames that include all objects or classes used in training models for prediction tasks, such as segmentation and object detection, and these labeled point cloud datasets exhibit a lack of diversity in their point cloud frames. Some of the object classes appear in limited numbers in the point cloud frames included in these labeled point cloud datasets, and the object classes often do not appear together in a in a single point cloud frame. For example, in the SemanticKITTI dataset, bicyclists and motorcyclists appear together in only a few point cloud frames out of the 19,000 point cloud frames used for training a segmentation or object detection model using the point SemanticKITTI dataset. This lack of co-appearance in the point cloud frames included in the SemanticKITTI dataset of combinations of classes, especially for dynamic objects such as vehicles and pedestrians, affects the performance of models for predictions tasks, such as segmentation and object detection, trained using the SemanticKITTI dataset, because the model does not receive enough point cloud frames that include certain object class combinations during training of the model for a prediction task. Models for predictions tasks, such as segmentation and object detection, that are trained using point cloud datasets that lack the required degree of prevalence and diversity of object class combinations within point cloud frames tend to learn very similar features to recognize both object classes (e.g., "bicycle" and "motorcycle"), as the object classes may share many common features. This limits the ability of such models to learn the distinguishing features necessary to classify objects into the two different object classes.

Traditionally, the problem of sparse point cloud datasets used for a training model for a prediction task, such as segmentation and object detection, has been addressed through data augmentation. Data augmentation may be regarded as a process for generating new training samples (e.g., new labeled point cloud frames) from labeled point cloud frames included in an existing training dataset using any technique that can assist in improving the training of a model for a prediction task to achieve higher model accuracy (e.g. better predictions generated by the model). Existing approaches for data augmentation tend to focus on inserting images of objects into an existing video frame (i.e. a two-dimensional image) and may include tasks such as rotation, translation, scaling, adding noise, and offsetting of the image prior to insertion into the video frame. These tasks may be formalized and defined by "augmentation parameters", which are values used to define the transformations performed on image of an object when the image of the object is inserted into an existing video frame. In the case of point cloud datasets, only a limited number of techniques for data augmentation are known. Point Augment (described in Li, Ruihui & Li, Xianzhi & Heng, Pheng-Ann & Fu, Chi-Wing. (2020). PointAugment: An Auto-Augmentation Framework for Point Cloud Classification. 6377-6386. 10.1109/CVPR42600.2020.00641) is intended to augment a point cloud dataset used for training a model for a prediction task by generating new data samples (i.e., new point cloud frames) that are, at feature level, harder to detect than the original samples (i.e. point cloud frames included in the point cloud dataset). Another paper by Cheng et al. (Cheng, S., Leng, Z., Cubuk, E. D., Zoph, B., Bai, C., Ngiam, J., Song, Y., Caine, B., Vasudevan, V., Li, C., Le, Q. V., Shlens, J., & Anguelov, D. (2020). Improving 3D Object Detection through Progressive Population Based Augmentation. ArXiv, abs/2004.00831) describes data augmentation for large-scale point cloud datasets using an optimization task to find the best augmentation parameters for injecting the point cloud object instances into randomly chosen point cloud frames, at the cost of training a large number of models to explore and exploit different augmentation parameter values.

In these existing techniques for data augmentation, the focus is on optimizing data augmentation parameters when injecting new objects into a large-scale point cloud (i.e. a point cloud frame). The existing techniques for data augmentation do not fully consider scene understanding (i.e. the model's accuracy in understanding and deciphering a scene) or other measures such as scene and object occurrences; their choice of which objects to inject into which point cloud frames, and where in the point cloud frame to inject the objects, is largely uncoupled from the specific needs of the model being trained. Furthermore, the techniques described in the paper by Cheng et al. are extremely computationally intensive, as they require a large number of models to be trained to optimize the augmentation parameters.

There thus exists a need for data augmentation techniques for point cloud datasets used in a training model for a prediction task that overcome one or more of the limitations of existing approaches described above.

SUMMARY

The present disclosure describes devices, systems, methods, and media for adaptive augmentation of point cloud frames used for training a machine learning model for a prediction task, such as segmentation and object detection. Examples described herein may provide a formal method for generating augmented point cloud frames based on pre-existing annotated large-scale point cloud datasets that include point cloud frames labeled with scene information and/or containing labeled point cloud object instances. The augmented point cloud frames may then be used in the training of a model for a prediction task, such as segmentation or object detection, to improve the accuracy of the model.

Examples of the methods and systems described herein may generate a policy for large-scale data augmentation of point cloud frames using detailed quantitative metrics such as confusion matrices. The policy, referred to as a "primary policy", may be a detailed and stepwise set of rules, procedures, and/or conditions that may be used to generate augmented point cloud frames specifically targeted to mitigate the existing inaccuracies in the predictions output by a trained model (i.e., a model trained using a point cloud dataset). An example method may include the following general steps:

1. Performing confusion analysis on the model's predictions using quantitative analysis (e.g. based on a confusion matrix) to identify which object classes and scene types tend to confuse the model due to a lack of labeled point cloud frames including those object classes and/or scene types.

2. Generating three sub-policies of a primary policy, using information from step 1 and other related prior knowledge, to answer the following questions:

2a. What object instances should be injected into point cloud frames of the point cloud dataset?

2b. Into what scene types should the object instances be injected, and where in the scene should they be injected?

2c. What other object classes, if any, should be injected in conjunction with the injected instances?

3. Generating a system to use the information from steps 1 and 2 above to apply a set of object instance transformation techniques (called "secondary policies") to inject the selected object instances into the selected point cloud frames to generated augmented point cloud frames, which can be added to the point cloud dataset that is used to re-train the model for the prediction task, thereby mitigating the existing inaccuracies in the predations exhibited by the predictions output by the model trained used the previous point cloud dataset (e.g. the point cloud dataset that does not include the augmented point cloud frames).

As noted above, the focus of existing techniques for data augmentation has been the optimization of augmentation parameters defining the transformations performed on an object when the object is inserted into an existing point cloud frame, such as rotation, translation, and scaling of the object. Object instance transformation techniques (i.e. secondary policies used by the examples described herein) may include:

1. Ground truth augmentation: Adding two or more point cloud object instances of the same object together.

2. Random flip: Flipping a point cloud object instance, e.g. horizontally.

3. World scaling: Scaling the size of the point cloud object instance.

4. Global translate noise: Translating the point cloud object instance to a different location.

5. Frustum dropout: Deleting a region of the visible surface of a point cloud object instance, e.g. to simulate partial occlusion.

6. Frustum noise: Randomly perturbing the location of points of the point cloud object instance, e.g. to simulate slightly different surface details.

7. Random rotation: Rotation of the point cloud object instance about an axis.

8. Random drop points of a point cloud object instance: Deleting a randomly selected subset of points of the point cloud object instance, e.g. to simulate a lower-resolution scan.

Existing techniques for data augmentation of point cloud datasets typically generate object instances with limited variability, transform the object instances using augmentation parameters, and inject the object instances at random locations in the point cloud dataset (e.g., into randomly selected frames, and/or at random locations within the frames).

Examples described herein may use existing techniques (e.g., secondary policies) to generate reasonable and realistic point cloud object instances to inject into point cloud frames. However, the methods and systems described herein provide techniques for generating primary policies that apply existing secondary policies in a systematic, global manner to address the problem of data augmentation by identifying specific model inaccuracies and generating augmented point cloud data targeted at mitigating these identified inaccuracies.

In collecting and labeling large-scale point cloud datasets to train models for prediction tasks such as segmentation or object detection, it is difficult to collect point cloud frames representing all scenarios that are likely to happen in the real world. This is mostly due to the point cloud frames being recorded for a limited time and kept for a long time without updating after being labeled. However, the very nature of a good model is the ability to generalize a solution, e.g. segmentation or object detection for as many of the real-world scenarios as possible. Examples described herein may alleviate issues such as:

1. A lack of labeled point cloud frames for corner cases (i.e., cases that do not happen often and are missing in the point cloud dataset).

2. A lack of point cloud frames in which multiple objects appear together (e.g., cars and animals do not appear together in any point cloud frames in most existing labeled point cloud datasets).

3. A lack of a specific object in most point cloud frames (e.g., there are not very many instances of trucks or buses in point cloud datasets used for training models for prediction tasks in autonomous driving applications).

4. The difficulty of training a generalized machine learned model (e.g., using deep learning) for a prediction task, such as segmentation or object detection.

Furthermore, some examples described herein may exhibit advantages over existing techniques for data augmentation, such as:

1. Described example embodiments of the method of the present disclosure may operate using only pre-existing labeled point cloud frames (e.g., frames and object instances generated by a LIDAR sensor), but may also be used to augment existing point cloud frames using other sources of point cloud object instances from other point cloud datasets if needed. For example, point cloud object instances obtained using a LIDAR sensor outside of the context of autonomous driving (such as point cloud object instances of animal bodies) may be used to generate additional point cloud object instances for injection to augment an autonomous driving dataset, further improving the accuracy of the model in recognizing objects infrequently encountered in a given application domain (e.g., autonomous driving).

2. Described examples of the method of the present disclosure may reuse the scene and background information contained within existing point cloud frames, as opposed to some existing techniques for data augmentation in which an entire scene is generated using graphical simulation. By using pre-existing point cloud frames based on actual scene scans by a sensor, such as a LIDAR sensor, a better model of the world may be provided, thereby improving the prediction accuracy of the model.

3. By adjusting the primary and secondary policies, examples of the method of the present disclosure described herein can address many corner cases that are important to the model's prediction task (e.g., injecting cars at intersections, modeling scenes at long distances, etc.).

4. Examples of the method of the present disclosure described herein may provide low cost, fast, and easy techniques to augment point cloud frames used for training a model for a prediction task, using available quantitative metrics (e.g. confusion matrices).

5. A model trained using a point cloud dataset that includes augmented point cloud frames by examples methods described herein may exhibit improvement not only in overall prediction accuracy of the model, but also in prediction domains identified as problematic or deficient, by targeting specific inaccuracies in the predictions output by the model rather than average metrics (such as global mean-intersection-over-union, mIoU) that do not identify the specific underlying deficiencies in the point cloud dataset used to train the model.

In the present disclosure, the term "LIDAR" (also "LiDAR" or "Lidar") refers to Light Detection And Ranging, a sensing technique in which a sensor emits beams of light and determines the location, and potentially other features, of light-reflective objects in the surrounding environment based on reflected light received from light-reflective objects in the surrounding environment.

In the present disclosure, the term "point cloud object instance", or simply "object instance" or "instance", refers to a point cloud for a single definable instance of an object such, as a car, house, or pedestrian, that can be defined as a single object. For example, typically a road cannot be an object instance; instead, a road may be defined within a point cloud frame as defining a scene type or region of the frame.

In the present disclosure, the term "injection" refers to the process of adding a point cloud object instance to a point cloud frame.

In the present disclosure, the term "frame" refers to a point cloud frame unless otherwise indicated.

In some aspects, the present disclosure describes a non-transitory processor-readable medium having instructions tangibly stored thereon. The instructions, when executed by a processor device, cause the processor device to perform the method steps described above.

According to an aspect of the present disclosure, there is provided a method for augmenting a point cloud dataset comprising a plurality of point cloud frames and a plurality of labeled point cloud object instances. The method comprises a number of steps. Prediction accuracy information of a machine learned model trained to perform a prediction task using the point cloud dataset is obtained. The prediction accuracy information indicates an accuracy of the predictions generated by the machine learned model, and a deficient object class. A scene dictionary is obtained based on the plurality of point cloud frames and a plurality of labels of the plurality of labeled point cloud object instances. The prediction accuracy information and the scene dictionary are processed to generate a primary policy. The primary policy is applied to the point cloud dataset to identify a target point cloud frame of the plurality of point cloud frames, and a target point cloud object instance selected from the plurality of labeled point cloud object instances. The target point cloud object instance is labeled with the deficient object class. An augmented point cloud frame is generated by injecting the point cloud target object instance into the target point cloud frame.

According to another aspect of the present disclosure, there is provided a system for augmenting point cloud dataset comprising a plurality of point cloud frames and a plurality of labeled point cloud object instances. The system comprises a processor device and a memory storing machine-executable instructions thereon which, when executed by the processor device, cause the system to perform a number of steps. Prediction accuracy information of a machine learned model trained to perform a prediction task using the point cloud dataset is obtained. The prediction accuracy information indicates an accuracy of the predictions generated by the machine learned model, and a deficient object class. A scene dictionary is obtained based on the plurality of point cloud frames and a plurality of labels of the plurality of labeled point cloud object instances. The prediction accuracy information and the scene dictionary are processed to generate a primary policy. The primary policy is applied to the point cloud dataset to identify a target point cloud frame of the plurality of point cloud frames, and a target point cloud object instance selected from the plurality of labeled point cloud object instances. The target point cloud object instance is labeled with the deficient object class. An augmented point cloud frame is generated by injecting the point cloud target object instance into the target point cloud frame.

In some example aspects of the method and system, the plurality of point cloud frames may comprise the plurality of labeled point cloud object instances.

In some example aspects of the method and system, obtaining the prediction accuracy information may comprise: obtaining a plurality of ground truth object class labels of inputs to the machine learned model; and determining, for each ground truth object class label of the plurality of ground truth object class labels, a distribution of predicted object class labels of the predictions. The prediction accuracy information may comprise the distribution of predicted object class labels for each ground truth object class label.

In some example aspects of the method and system, the prediction accuracy information may comprises at least one confusion matrix indicating the distribution of predicted object class labels for at least one ground truth object class label of the plurality of ground truth object class labels.

In some example aspects of the method and system, the primary policy may further indicates a second deficient object class. Applying the primary policy may further identify a second target object instance selected from the plurality of labeled point cloud object instances. The second target object instance may be labeled with the second deficient object class. Generating the augmented point cloud frame may comprises injecting the target object instance and the second target object instance into the target point cloud frame.

In some example aspects of the method and system, injecting the target point cloud object instance into the target point cloud frame comprises using the primary policy to identify a location in the target point cloud frame, and injecting the target point cloud object instance into the target point cloud frame at the location.

In some example aspects of the method and system, injecting the target point cloud object instance into the target point cloud frame comprises using one or more secondary policies to transform the target point cloud object instance to generate a transformed point cloud object instance, and injecting the transformed point cloud object instance into the target point cloud frame.

In some example aspects of the method and system, processing the prediction accuracy information and the scene dictionary to generate the primary policy comprises processing the class specific confusion matrix and the scene dictionary to generate the primary policy. The primary policy may indicate a plurality of deficient object classes; and the primary policy may comprise, for each deficient object class of the plurality of deficient object classes, injection conditions under which a point cloud object instance of the deficient object class should be injected into a given point cloud frame. The primary policy may be applied to the point cloud dataset to identify the target point cloud frame comprises determining whether the target point cloud frame satisfies the injection conditions of the primary policy with respect to the target object class.

In some examples, the method may further comprises, after using the augmented point cloud frame to further train the machine learned model, repeating one or more times the steps of obtaining the prediction accuracy information, generating the primary policy, identifying the target point cloud frame, identifying the target object instance, generating the augmented point cloud frame, and further training the machine learned model.

In some example aspects of the method and system, the augmented point cloud frame, after being generated, may be used to further train the machine learned model.

In some example aspects of the method and system, the steps of obtaining the prediction accuracy information, generating the primary policy, identifying the target point cloud frame, identifying the target object instance, generating the augmented point cloud frame, and further training the machine learned model may be repeated one or more times after using the augmented point cloud frame to train the machine learned model.

According to another aspect of the present disclosure, there is provided a non-transitory processor-readable medium having stored thereon a point cloud dataset comprising one or more augmented point cloud frames generated by the aspects of the method described above.

According to another aspect of the present disclosure, there is provided a non-transitory processor-readable medium having machine-executable instructions stored thereon which, when executed by a processor device of a device, cause the device to perform a number of steps. Prediction accuracy information of a machine learned model trained to perform a prediction task using the point cloud dataset is obtained. The prediction accuracy information indicates an accuracy of the predictions generated by the machine learned model, and a deficient object class. A scene dictionary is obtained based on the plurality of point cloud frames and a plurality of labels of the plurality of labeled point cloud object instances. The prediction accuracy information and the scene dictionary are processed to generate a primary policy. The primary policy is applied to the point cloud dataset to identify a target point cloud frame of the plurality of point cloud frames, and a target point cloud object instance selected from the plurality of labeled point cloud object instances. The target point cloud object instance is labeled with the deficient object class. An augmented point cloud frame is generated by injecting the point cloud target object instance into the target point cloud frame.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes example devices, systems, methods, and media for adaptive scene augmentation for training machine learning models to perform point cloud segmentation and/or object detection.

Figure 1:
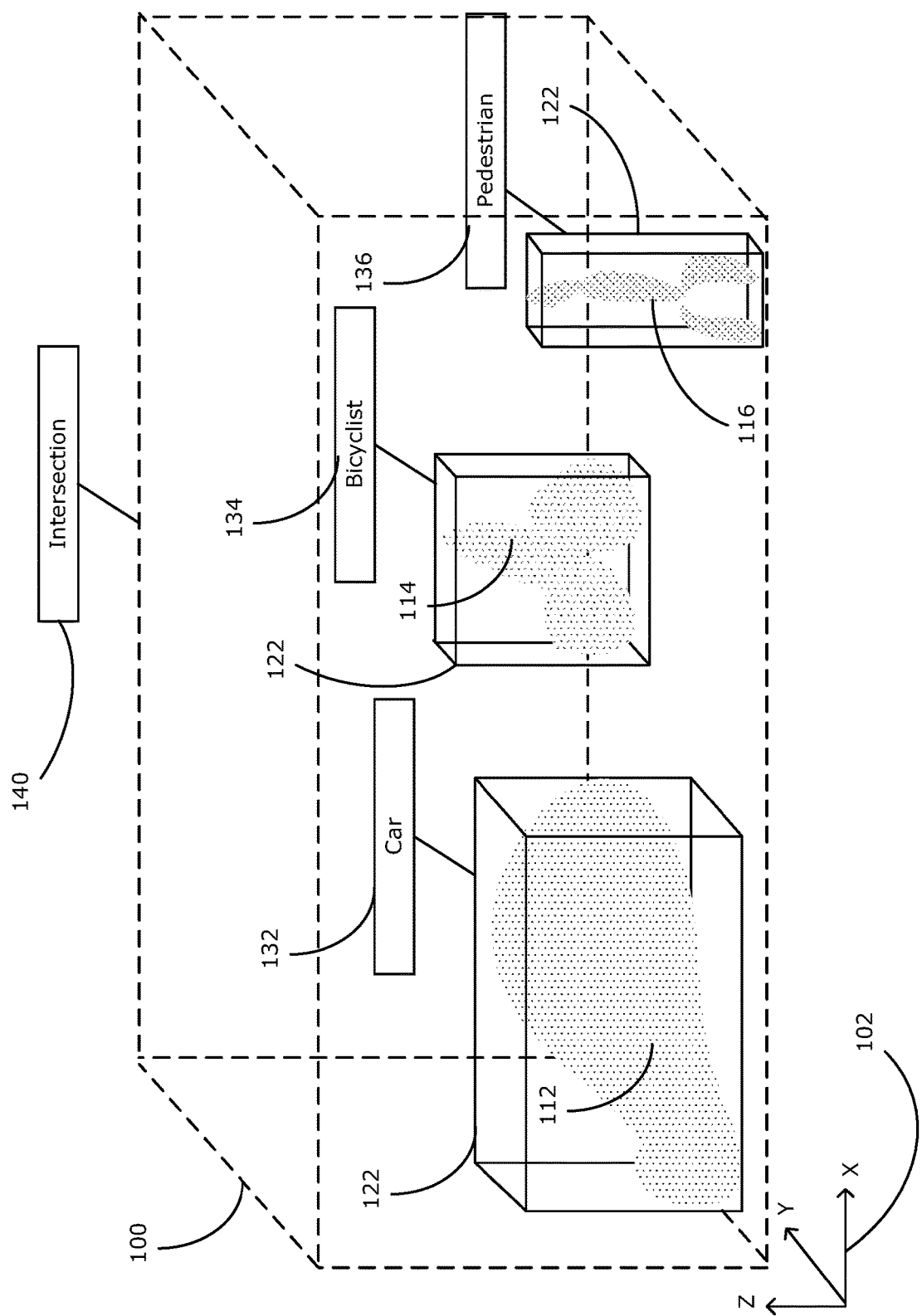
FIG. 1 is a upper front right side perspective view of an example simplified point cloud frame, providing an operating context for embodiments described herein.

FIG. 1 shows an example simplified point cloud frame 100, with points mapped to a three-dimensional coordinate system 102 X, Y, and Z, wherein the Z dimension extends upward, typically as defined by the axis of rotation of the LIDAR sensor or other panoramic sensor generating the point cloud frame 100. The point cloud frame 100 includes a number of points, each of which may be represented by a set of coordinates (x, y, z) within the frame 100 along with a vector of other values, such as an intensity value indicating the reflectivity of the object corresponding to the point. Each point represents a reflection of a laser at a point in space relative to the LIDAR sensor corresponding to the point coordinates. Whereas the example point cloud frame 100 is shown as a box-shape or rectangular prism, it will be appreciated that a typical point cloud frame captured by a panoramic LIDAR sensor is typically a 360 degree panoramic view of the environment surrounding the LIDAR sensor, extending out to a full detection range of the lasers of the LIDAR sensor. The example point cloud frame 100 is thus more typical of a small portion of an actual point cloud frame generated by the LIDAR sensor, and is used for illustrative purposes.

The points of the point cloud frame 100 are clustered in space where the lasers of the LIDAR sensor are reflected by objects in the environment, thereby resulting in clusters of points corresponding to the surface of the object visible to the LIDAR. A first cluster of points 112 corresponds to reflections from a car. In the example point cloud frame 100, the first cluster of points 112 is enclosed by a bounding box 122 and associated with an object class label, in this case the label "car" 132. A second cluster of points 114 is enclosed by a bounding box 122 and associated with the object class label "bicyclist" 134, and a third cluster of points 116 is enclosed by a bounding box 122 and associated with the object class label "pedestrian" 136. Each point cluster 112, 114, 116 thus corresponds to an object instance: an instance of object class "car", "bicyclist", and "pedestrian" respectively. The entire point cloud frame 100 is associated with a scene type label 140 "intersection" indicating that the point cloud frame 100 as a whole corresponds to the environment near a road intersection (hence the presence of a car, a pedestrian, and a bicyclist in close proximity to each other).

In some examples, a single point cloud frame may include multiple scenes, each of which may be associated with a different scene type label 140. A single point cloud frame may therefore be segmented into multiple scenes, each scene being associated with its own scene type label 140. Example embodiments will be generally described herein with reference to a single frame being associated with only a single scene type; however, it will be appreciated that some embodiments may consider each scene in a frame separately for point cloud object instance injection using the data augmentation methods and systems described herein.

Each bounding box 122 is sized and positioned, each object label 132, 134, 136 is associated with each point cluster (i.e. cluster of points), and the scene label is associated with the point cloud frame 100 using data labeling techniques known in the field of machine learning for generating a labeled point cloud frame that can be included in a point cloud dataset that is used for training a model for a prediction task (e.g. segmentation or object detection) using machine learning. As described above, these labeling techniques are generally very time-consuming and resource-intensive; the method and system for data augmentation described herein may be used in some examples to augment the number of labeled point cloud object instances within a point cloud frame 100, thereby reducing the time and resources required to manually identify and label point cloud object instances in point cloud frames.

The labels and bounding boxes of the example point cloud frame 100 shown in FIG. 1 correspond to labels applied in the context of a prediction task, such as instance segmentation or object detection, and the point cloud frame 100 could therefore be included in a point cloud dataset used to train an object detection model (e.g. a model which receives point cloud frames as input and predicts an object class for objects in the point cloud frames). However, methods and systems for data augmentation described herein are equally applicable to point cloud frames that included in point cloud datasets that are used not only to train object detection models, but also to train segmentation models, including semantic segmentation models, instance segmentation models, or panoptic segmentation models.

Figure 2:
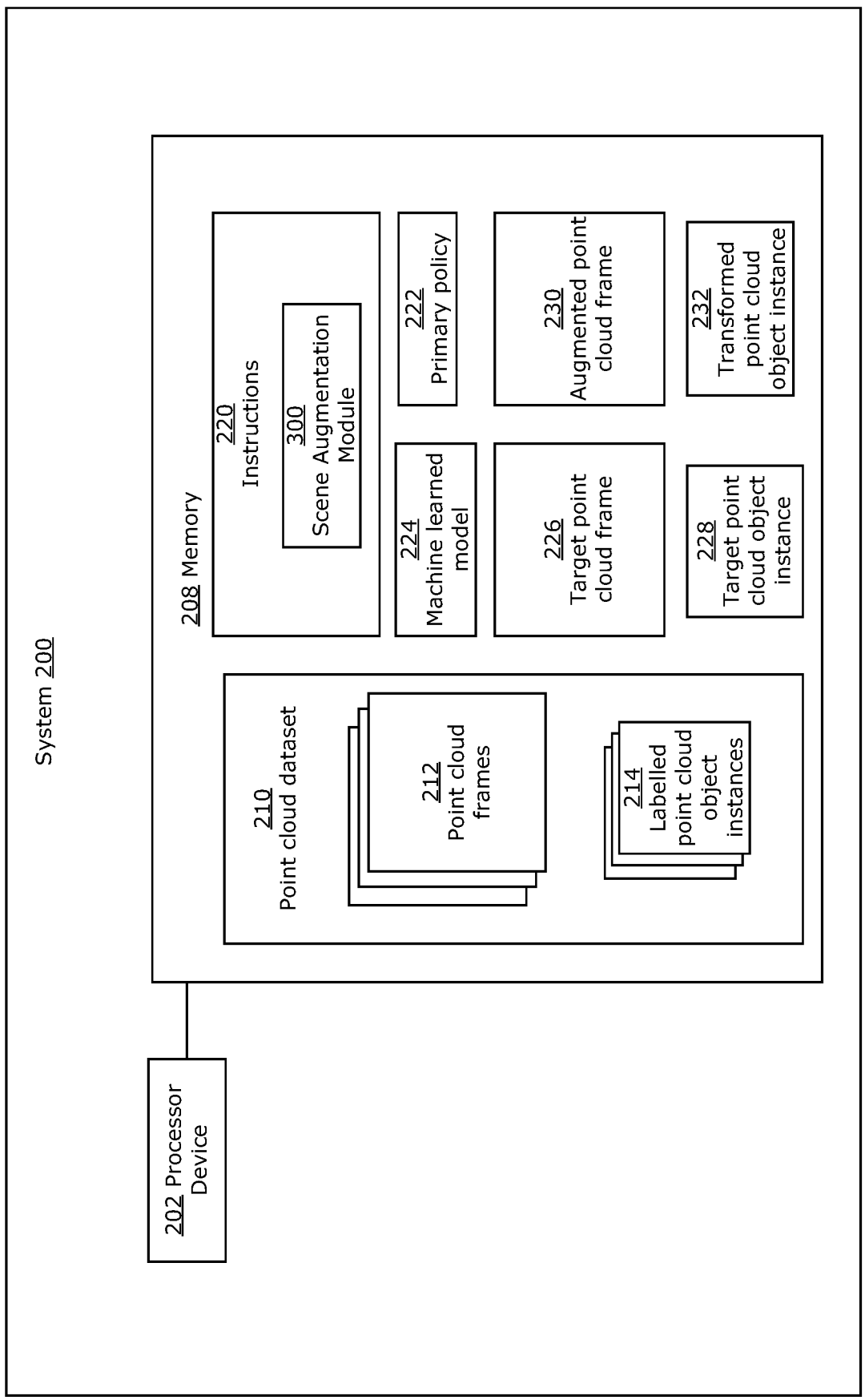
FIG. 2 is a block diagram illustrating some components of an example system for augmenting labeled point cloud data, in accordance with examples described herein.

FIG. 2 is a block diagram of a computing system 200 (hereafter referred to as system 200) for augmenting a point cloud dataset that includes point cloud frames. Although an example embodiment of the system 200 is shown and discussed below, other embodiments may be used to implement examples disclosed herein, which may include components different from those shown. Although FIG. 2 shows a single instance of each component of the system 200, there may be multiple instances of each component shown.

The system 200 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a "processor device" or "processor 202".

The system 200 includes one or more memories 208 (collectively referred to as "memory 208"), which may include a volatile or non-volatile memory (e.g., a flash memory, a random access memory (RAM), and/or a read-only memory (ROM)). The non-transitory memory 208 may store machine-executable instructions for execution by the processor 202. A set of machine-executable instructions 220 defining a scene augmentation module 300 is shown stored in the memory 208, which may be executed by the processor 202 to perform the steps of the methods for data augmentation of point cloud datasets described herein. The operation of the system 200 in executing the set of machine-executable instructions 220 defining the scene augmentation module 300 is described below with reference to FIG. 3. The set of machine-executable instructions 220 defining the scene augmentation module 300 are executable by the processor 202 to perform the functions of each subsystem 312, 314, 316, 318, 320, 322 thereof. The memory 208 may include other machine-executable instructions for execution by the processor 202, such as machine-executable instructions for implementing an operating system and other applications or functions.

The memory 208 stores a point cloud dataset 210. The point cloud dataset 210 includes a plurality of point cloud frames 212 and a plurality of labeled point cloud object instances 214, as described above with reference to FIG. 1. In some embodiments, some or all of the labeled point cloud object instances 214 are contained within and/or derived from the point cloud frames 212: for example, each point cloud frame 212 may include zero or more labeled point cloud object instances 214, as described above with reference to FIG. 1. In some embodiments, some or all of the labeled point cloud object instances 214 are stored separately from the point cloud frames 212, and each labeled point cloud object instance 214 may or may not originate from within one of the point cloud frames 212.

The memory 208 may also store other data, information, rules, policies, and machine-executable instructions described herein, including a machine learned model 224 for a prediction task, such as segmentation or objection detection, a primary policy 222, target point cloud frames 226, target point cloud object instances 228, transformed point cloud object instances 232, and augmented point cloud frames 230, as well as the data and information described below with reference to FIG. 3 (and not shown in FIG. 2), including prediction data 302, the prediction accuracy information 304, and a scene dictionary 306.

In some examples, the system 200 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 208 to implement data storage, retrieval, and caching functions of the system 200.

The components of the system 200 may communicate with each other via a bus, for example. In some embodiments, the system 200 is a distributed computing system and may include multiple computing devices in communication with each other over a network, as well as optionally one or more additional components. The various operations described herein may be performed by different computing devices of a distributed system in some embodiments. In some embodiments, the system 200 is a virtual machine provided by a cloud computing platform.

Figure 3:
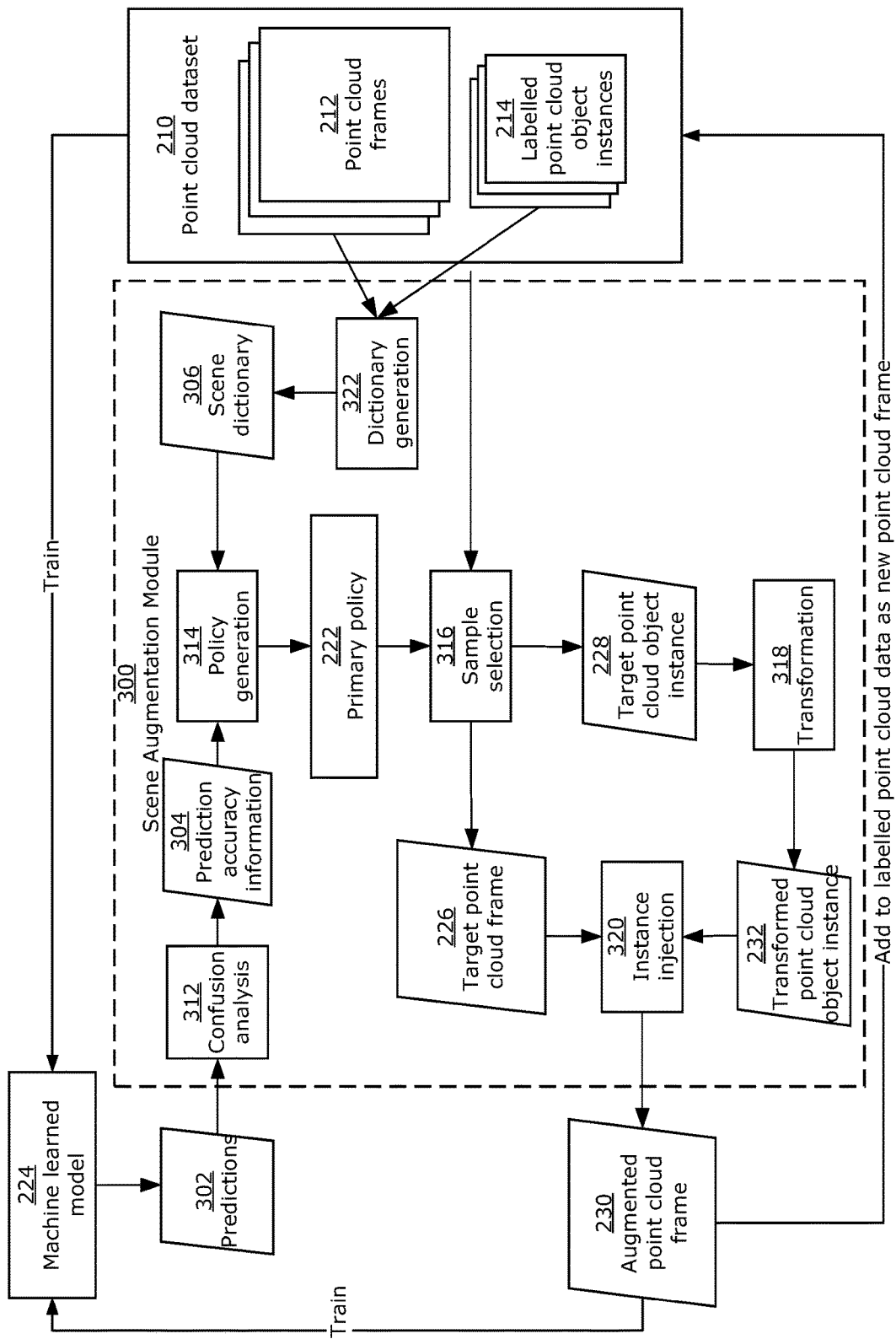
FIG. 3 is a block diagram illustrating the operation of the scene augmentation module of FIG. 2.

FIG. 3 illustrates a block diagram of an example embodiment of the scene augmentation module 300. The machine-executable instructions defining the scene augmentation module 300 are executable by the processor 202 of the system 200. The illustrated embodiment of the scene augmentation module 300 includes several functional sub-modules or subsystems: a confusion analysis subsystem 312, a policy generation subsystem 314, a sample selection subsystem 316, a transformation subsystem 318, an instance injection subsystem, 320, and a dictionary generation subsystem 322. In other examples embodiments of the scene augmentation module 300, one or more of the subsystems 312, 314, 316, 318, 320, and 322 may be combined, be split into multiple subsystems, and/or have one or more of its functions or operations redistributed among other subsystems. Some example embodiment of the scene augmentation module 300 may include additional operations or sub-modules, or may omit one or more of the illustrated subsystems 312, 314, 316, 318, 320, and 322.

The operation of the various subsystems 312, 314, 316, 318, 320, and 322 of the scene augmentation module 300 shown in FIG. 3 will now be described with reference to an example point cloud data augmentation method 400 shown in FIG. 4.

Figure 4:
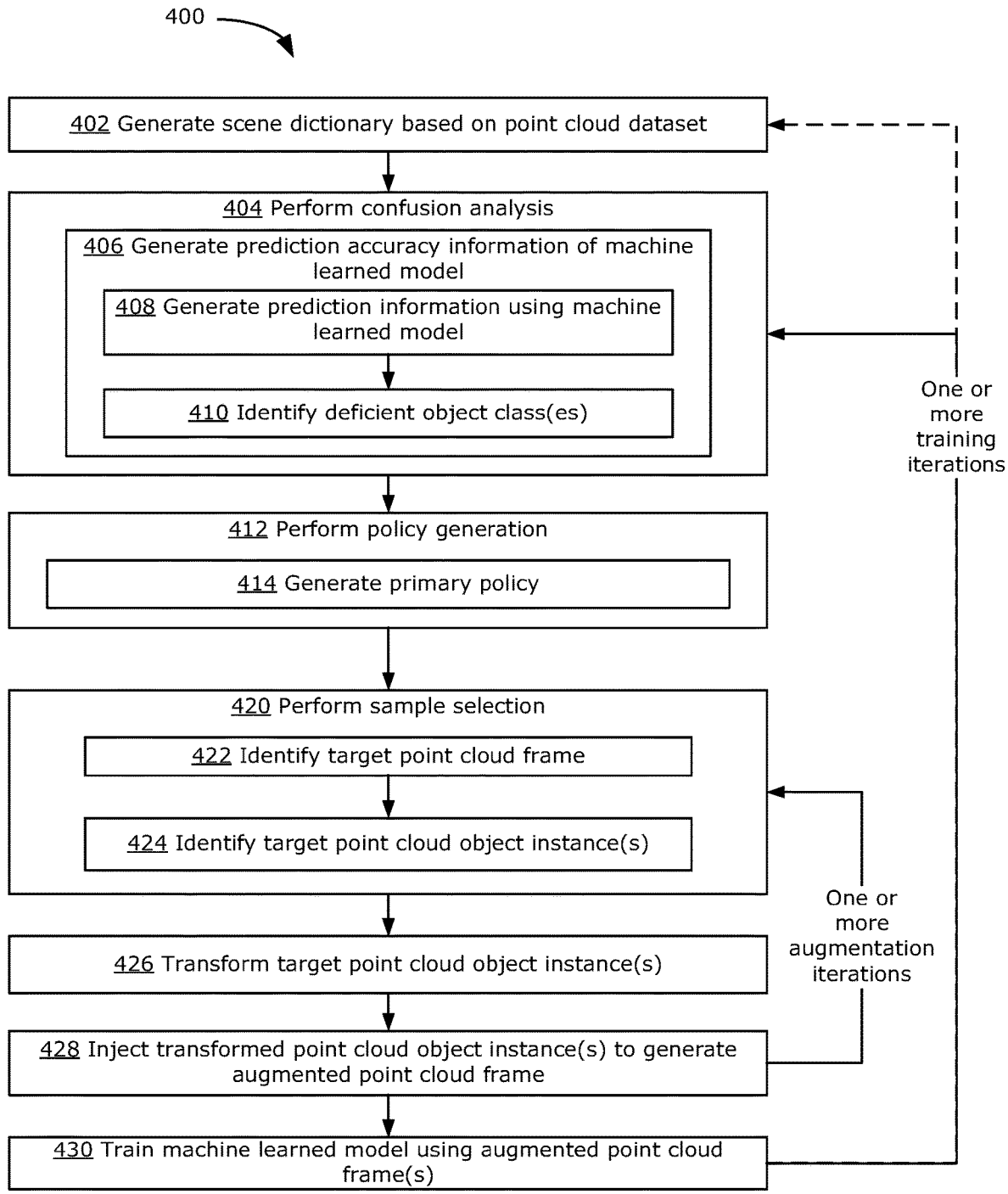
FIG. 4 is a flowchart illustrating steps of an example method for augmenting labeled point cloud data that may be performed by the scene augmentation module of FIG. 3.

FIG. 4 is a flowchart showing steps of an example of an adaptive data augmentation method 400 (hereinafter referred to as method 400) of the present disclosure. As described, the steps of the method 400 are performed by the various subsystems of the scene augmentation module 300 and other subsystems shown in FIG. 3. However, it will be appreciated that the method 400 may be performed by any suitable information processing technology.

The method 400 begins at step 402. A dictionary generation subsystem 322 generates a scene dictionary 306 based on the point cloud dataset 210. In some embodiments, the scene dictionary 306 is a list of scene types, each scene type associated with a list of objects that are likely to appear in a given scene type, or that should appear in a given scene type to ensure proper diversity in the training point cloud dataset. The contents of the scene dictionary 306 may be generated by the dictionary generation subsystem 322 by compiling, for each scene type, a list, of object classes represented among the labeled point cloud object instances 214 present within each point cloud frame 212 of the given scene type. A simplified, truncated example of a scene dictionary 306 generated based on point cloud dataset 210 where a list of objects for a given scene type is for an autonomous vehicle context is shown in Table 1 below:

TABLE 1

Example scene dictionary

| Scene type | Possible dynamic object classes that can appear in the scene |
|---|---|
| Free road | All objects |
| Intersection | Pedestrian, cyclist, car, truck |
| Free sidewalk | Cyclist, pedestrian |
| Two-way road | Car, truck, bus |
| Parking | All objects |
| Highway | Car, truck |
| . . . | . . . |

At step 404, a confusion analysis subsystem 312 performs confusion analysis of a machine learned model 224.

The machine learned model 224 may be an artificial neural network or another model which has been trained using a training dataset and a machine learning techniques, such as supervised learning, to perform a prediction task on point cloud frames. The prediction task may be any prediction task, such as object detection (e.g. recognizing objects in the point cloud frame and classifying the recognized objects (i.e. predicting an object class label for each object recognized in a point cloud frame)) or segmentation (e.g. segmenting a point cloud frame by object class), including semantic segmentation, instance segmentation, or panoptic segmentation. In some embodiments, the machine learned model 224 is trained using the point cloud dataset 210 as a training dataset: i.e., the machine learned model 224 is trained using the point cloud dataset 210 and a supervised learning algorithm, to perform a prediction task for point cloud frames, such as object detection or segmentation on the point cloud frames 212, thereby generating predictions 302 including predicted object class labels and/or predicted instance labels for the objects recognized in each point cloud frame 212 to associate with zero or more subsets or clusters of points within each point cloud frame 212, with the predicted object class and/or instance labels associated with each labeled point cloud object instance 214 in a given point cloud frame 212 used for generating the policies described in further detail below. In other embodiments, the machine learned model 224 is trained using a different training dataset and a supervised learning algorithm. However, it will be appreciated that systems and methods for augmenting labeled point cloud frames described herein may exhibit particular advantages when used to augment point cloud frames 212 included in the point cloud dataset 210 which is used to train the machine learned model 224: the data augmentation systems and methods described herein may augment point cloud frames 212 to address specific deficiencies identified in the point cloud dataset 210 that result in specific inaccuracies in the performance of a machine learned model 224 which has been trained using the point cloud dataset 210, such that re-training the machine learned model 224 using the augmented point cloud frames (or an augmented point cloud dataset that includes the point cloud frames 212 and the augmented point cloud frames) remedies those specific inaccuracies in the accuracy of the machine learned model 224 in predicting labels (i.e. object class labels and/or instance labels).

Step 404 includes sub-step 406, in which the confusion analysis subsystem 312 generates prediction accuracy information 304 indicating an accuracy of the predictions (i.e. the predicted labels) generated by the machine learned model 224, and indicating at least one deficient object class. Deficient object classes are object classes for which the machine learned model 224 does not generate accurate predictions 302, e.g., because it generates too many false negatives and/or too many false positives in recognizing or otherwise identifying instances of the object class.

Sub-step 406 includes further sub-steps 408 and 410. At 408, the machine learned model 224 generates predictions 302, which is used by the confusion analysis subsystem 312 to generate the prediction accuracy information 304. In some embodiments, at sub-step 408, the predictions 302 may be retrieved or otherwise obtained (e.g. from the memory 208) without being generated by the machine learned model 224 as part of the method 400. For example, when the prediction task of the machine learned model 224 is object detection, the predictions 302 may be a predicted object class label, an instance class label for each objected detected in a point cloud frame, or 3D bounding boxes associated with an object class label (as shown in the object detection example of FIG. 1). When the prediction task of the machine learned model 224 is segmentation, the predictions 302 may be point cloud frame segmentation predictions, such as, an object class label associated with each point in the point cloud frame (for semantic segmentation), an object class label and an instance identification label associated with each point in the point cloud frame (for panoptic segmentation), or instance identification label associated with each point in the point cloud frame (for instance segmentation). The confusion analysis subsystem 312 compares the prediction data 302 generated by machine learned model 224 for each respective point cloud frame 212 input to the machine learned model 224 to the ground truth labels of the respective point cloud frame 212 to generate prediction accuracy information 304, such as a confusion matrix, indicating the accuracy of the of the predictions 302 generated by the machine learned model 224. The confusion matrix is an error matrix cross-referencing the predicted object class labels included in the predictions 302 generated by the machine learned model 224 over one or more point cloud frames 212 against the pre-existing ground truth labels associated with point cloud object instances in the point cloud frame 212. Thus, a confusion matrix indicates the distribution of predicted object class labels for each ground truth object class label of the inputs (i.e., ground truth labels of the point cloud frames 212) to the machine learned model 224. An example confusion matrix is shown below:

TABLE 2

Example confusion matrix

|  |  | Ground truth labels | | |
| --- | --- | --- | --- | --- |
|  |  | Car | Bicyclist | Motorcyclist |
| Predicted Labels | Car | 75 | 1 | 0 |
|  | Bicyclist | 2 | 15 | 4 |
|  | Motorcyclist | 4 | 8 | 6 |

For a perfectly accurate machine learned model 224, the confusion analysis subsystem 312 would generate prediction information 304 corresponding to a confusion matrix wherein only the diagonal cells of the matrix had non-zero values, i.e., wherein all ground truth "car" labels which were predicted as "car" labels, and so on for each object class. However, in the example shown above, the machine learned model 224 exhibits imperfect accuracy: for example, out of 81 "car" ground truth labels associated with point cloud object instances, only 75 points in the point cloud frame were predicted by the machine learned model 224 as "car" labels by the machine learned model 224, with 2 points in the point cloud frame being predicted as "bicyclist" labels and 4 as "motorcyclist" labels. The greatest degree of inaccuracy and confusion, however, can be seen between the "bicyclist" and "motorcyclist" classes, which are commonly misidentified as each other by the machine learned model 224. A "bicyclist" object instance has a (8/23=34.7%) chance of being misidentified as a "motorcyclist", and a "motorcyclist" object instance has a (4/10=40%) chance of being misidentified as a "bicyclist". This inaccuracy may be the result of too few instances of the "bicyclist" and/or "motorcyclist" object classes being included in the training dataset used to train the machine learned model 224, or too few point cloud frames in which instances of both object classes ("bicyclist" and "motorcyclist") appear in a context that would assist in training the machine learned model 224 to distinguish between the two object classes. The adaptive data augmentation methods and systems described herein may enable systematic, automatic analysis of the specific confusion patterns exhibited by a machine learned model 224 trained by a specific point cloud dataset, thereby generating a primary policy configured to augment specific point cloud frames in the point cloud dataset by injection of instances of one or more specific object classes into a point cloud frame, at particular locations within the point cloud frame, using particular transformation of the injected instance of the specific object class, such that the confusion patterns exhibits by the machine learned model 224 may be mitigated or eliminated after further training of the machine learned model 224 using the augmented point cloud frames (or an augmented training dataset including the point cloud dataset 212 and the augmented point cloud frames).

The number of instances of each object class shown in the confusion matrix shown above are used for illustrative purposes only. They are higher than the number of instances of each object class that would typically be found in a single point cloud frame, and smaller than the number that would typically be found in an entire point cloud dataset used for training the machine learned model 224. Instead, they may be considered representative of a portion of point cloud frames of a point cloud dataset used to train the machine learned model 224, such as a single drive sequence (i.e. a sequence of point cloud frames captured by a vehicle-mounted LIDAR sensor during the course of a driving session).

At step 410, the confusion analysis subsystem 312 identifies one or more deficient object classes and indicates the identified deficient object classes in the prediction accuracy information 304. The confusion analysis subsystem 312 may use the overall confusion matrix for the machine learned model 224 to identify the one or more deficient object classes, generate a class specific confusion matrix for each deficient object class based on the overall confusion matrix, and include the class specific confusion matrices as part of the prediction accuracy information 304. In some embodiments, a class specific confusion matrix, $M_c$, is generated for each object class that has a prediction accuracy falling below an accuracy threshold, and is therefore identified by the confusion analysis subsystem 312 as a deficient object class. Thus, a deficient object class may be identified as such based on the confusion matrix entry for the deficient object class, i.e. the distribution of predicted object class labels for a ground truth object class label corresponding to the deficient object class. Prediction accuracy indicates the accuracy of the predictions generated by the machine learned model 224. Prediction accuracy may be measured as the mean intersection over union (mIoU) for a given object class, which may be computed as the intersection of ground truth labels and the predicted labels (i.e. the total number of object instances in the point cloud dataset 210 for which the ground truth label and the predicted label are both the same object class), divided by the union of ground truth label and the predicted label (i.e., the total number of object instances in the point cloud dataset 210 that have either a predicted label or a ground truth label of the same object class). The mIoU can also be represented as (the number of true positive predictions for the object class)/(the number of true positive predictions+the number of false positive predictions for the object class+the number of false negative predictions for the object class). Thus, in the simplified example confusion matrix in Table 2, the mIoU of object class "bicyclist" is (15/(15+2+4+1+8))=0.50, whereas the mIoU of object class "motorcyclist" is (6/(6+8+4+4+0))=0.27, and the mIoU of object class "car" is (75/(75+1+0+2+4))=0.91. The mean IoU may be a mean of the intersection over union computed over a number of point cloud datasets or subsets of point cloud datasets that are used for validation, such as the mean of the intersection over union computed for each point cloud frame 212 in the point cloud dataset 210.

For each class c E C in the overall confusion matrix CM, the confusion analysis subsystem 312 may determine whether to generate the class specific confusion matrix $CM_c$ (i.e., the confusion matrix for a specific object class). If the mIoU or other accuracy measure of the class, $mIoU_c$, is below an accuracy threshold $th_c$, then class specific confusion matrix $CM_c$ is generated as the top N confusion matrix elements related to object class c. Thus, in the simplified example confusion matrix in Table 2, the accuracy threshold $th_c$ might be defined as 0.80 and the number of confusion matrix elements N might be defined as 1. In such an example, class specific confusion matrices $M_{bicyclist}$ and $M_{motorcyclist}$ would be generated for object classes "bicyclist" and "motorcyclist" respectively, as both have mIoU falling below 0.80. The top confusion matrix element for object class "bicyclist", computed based on the number of false negatives and/or false positives between "bicyclist" and each other object class, would be "motorcyclist" (with 8 false negatives and 4 false positives, more false negatives and false positives than with respect to object class "car"); similarly, the top confusion matrix element for object class "motorcyclist" would be "bicyclist" (with 4 false negatives and 8 false positives). Thus, the class specific confusion matrix for the deficient object class may indicate the distribution of predicted object class labels for the ground truth object class label corresponding to the deficient object class.

After generating the class specific confusion matrices, the confusion analysis subsystem 312 may store each deficient object class c and its respective class specific confusion matrix $CM_c$ in the memory 208.

In some embodiments, the prediction accuracy information 304 may include other information indicating an accuracy of the predictions 302 generated by the machine learned model 224.

Returning to FIG. 4 and FIG. 3, at step 412, a policy generation subsystem 314 processes the prediction accuracy information 304 and the scene dictionary 306 to generate a primary policy 222. The primary policy 222 is generated at step 414, which comprises a number of sub-steps shown in detail in FIG. 5.

Figure 5:
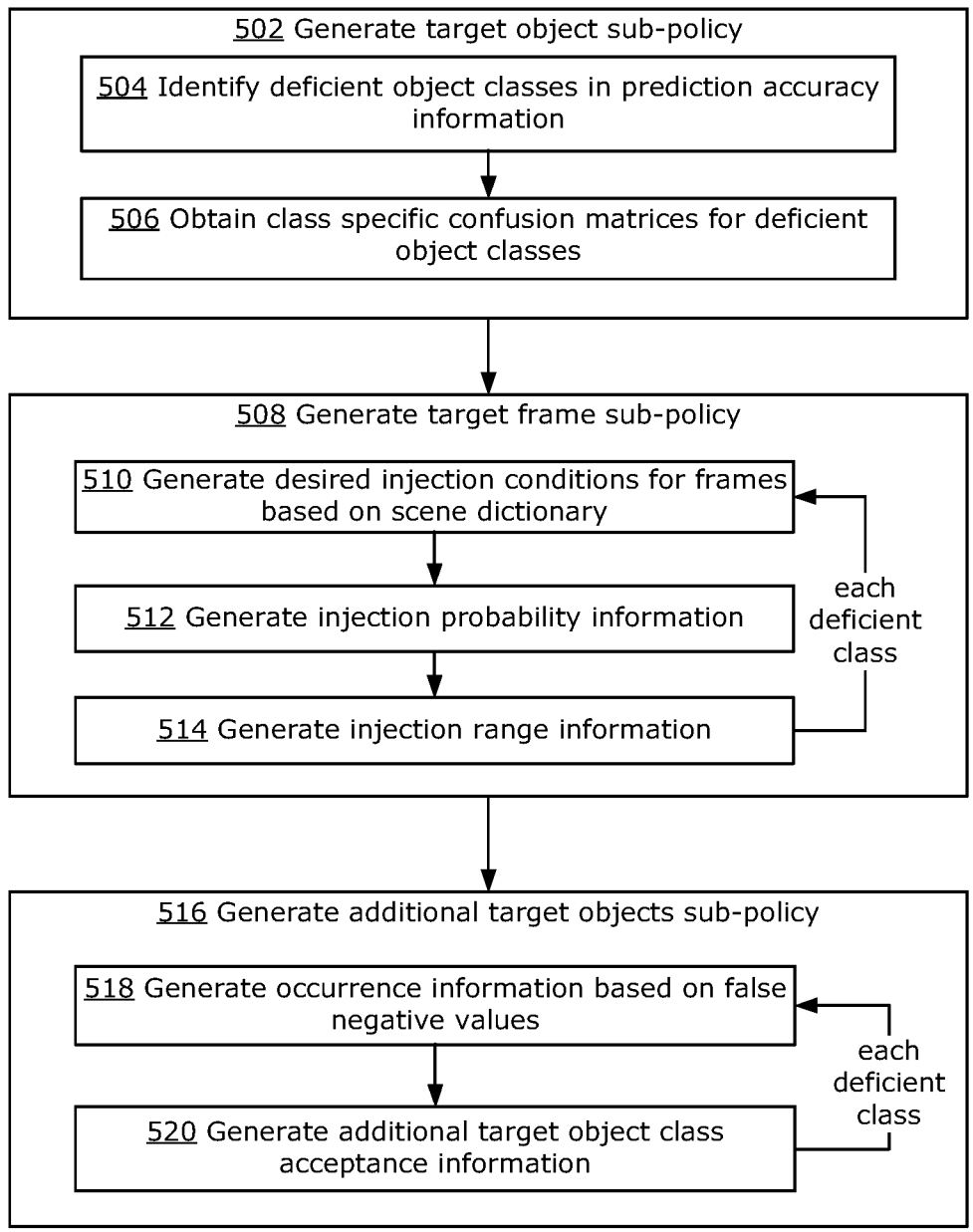
FIG. 5 is a flowchart illustrating sub-steps of primary policy generation step 414 of FIG. 4.

FIG. 5 shows sub-steps of primary policy generation step 414 of method 400. The primary policy 222 is generated in three steps, each of which generates a distinct sub-policy. The primary policy 222 may be referred to herein as π, the first sub-policy (called the target object sub-policy) as $\pi_1$, the second sub-policy (called the target frame sub-policy) as $\pi_2$, and the third sub-policy (called the additional target objects sub-policy) as $\pi_3$.

First, at step 502, the policy generation subsystem 314 generates the target object sub-policy $\pi_1$. Step 502 includes sub-steps 504 and 506. At 504, deficient object classes are identified in the prediction accuracy information 304. If an object class has an accuracy (e.g., mIoU) below the accuracy threshold, the target object sub-policy identifies the object class as a deficient object class and indicates as such by setting a policy parameter value: for example, if $mIoU_c < th_c$ then $\pi_{1,c}$=True. At 506, for each deficient object class identified at 504, the class specific confusion matrix $CM_c$ for the deficient object class c is obtained, e.g. retrieved from the memory 208. It will be appreciated that sub-step 504 and step 410 of method 400 may be combined or otherwise coordinated in some embodiments, for example, a list of deficient object classes may be identified at step 410 and obtained at sub-step 504 to avoid the need to re-compute the accuracy $mIoU_c$ of each object class.

Second, at step 508, the policy generation subsystem 314 generates the target frame sub-policy $\pi_2$. For each deficient object class (e.g. object classes for which $mIoU_c < th_c$), the policy generation subsystem 314 performs sub-steps 510, 512, and 514. At 510, the policy generation subsystem 314 generates a scene condition $cond_c$ for scene types from the scene dictionary 306, the scene condition indicating a condition under which a point cloud object instance of the current deficient object class should potentially be injected into a given point cloud frame. For example, with reference to the example scene dictionary 306 shown in Table 1 above, a scene condition for object class "pedestrian" may be the condition that the scene type label associated with the point cloud frame under consideration is of the scene type "intersection", "free sidewalk", or "parking". The scene condition may be considered an "injection condition", i.e. a necessary condition under which injection will occur.

At 512, the policy generation subsystem 314 generates a probability of injection $p_{inject,c}$ indicating a probability that a point cloud object instance of the current deficient object class should be injected into the point cloud frame under consideration if $cond_c$ is met. The probability of injection $p_{inject,c}$ may considered a further injection condition, i.e. injection of a point cloud object instance of the current deficient object class will only occur if in a random subset of frames wherein the size of the subset proportional to the entire point cloud dataset 210 (e.g. point cloud frames 212) is defined by the probability of injection.

At 514, the policy generation subsystem 314 generates a range $R_c$ in which the point cloud object instance of deficient object class c should be injected. The range indicates a spatial region, such as a range of distances from the observer, e.g. the LIDAR sensor used to generate the point cloud frame. In embodiments using point cloud frames containing multiple scenes, each point cloud frame potentially having a different scene type, the range $R_c$ may act as a further injection condition by limiting the scene types within the point cloud frame into which the point cloud object instance of the current deficient object class may be injected, and potentially precluding injection of a point cloud object instance of the current deficient object class in a given point cloud frame if no scene of the required scene type (i.e. satisfying the scene condition) is present within the required range.

Thus, for each deficient object class, the policy generation subsystem 314 may generate three injection conditions under which a point cloud object instance of the deficient object class should be injected into a given point cloud frame: the scene condition, the probability of injection of the point cloud object instance, and the range.

At 516, the policy generation subsystem 314 generates the additional target objects sub-policy $\pi_3$. For each deficient object class (e.g. object classes for which $mIoU_c < th_c$), the policy generation subsystem 314 performs sub-steps 518 and 520. At 518, occurrence information is generated based on false negative values. The policy generation subsystem 314 uses the class-specific confusion matrix $CM_c$ for the current deficient class c to identify all object classes $c_{FN}$ with a FN (false negative) value greater than a specific threshold. Each identified object class $c_{FN}$, which may be referred to as a high-confusion additional object class, is considered for potential injection of a point cloud object instance into a point cloud frame along with the current deficient object class; the list of high-confusion additional object classes $c_{FN}$ identified at step 516 may be denoted as $\{c_{FN_1}, c_{FN_2}, \ldots\}$. Each high-confusion additional object class $c_{FN}$ is assigned a desired probability of occurrence, $p_{occurrence}$, indicating how often a point cloud object instance of a given high-confusion additional object class $c_{FN}$ should be injected along with a point cloud object instance of the current deficient object class. Typically, the higher the degree of confusion between the current deficient object class and a given high-confusion additional object class (e.g., the greater the false negative value), the higher the value assigned to $p_{occurrence}$. This means that point cloud object instances of additional object classes exhibiting a greater number of false negatives with respect to the current deficient object class are more likely to be injected into a point cloud frame such that point cloud object instances of the two object classes co-exist within a single augmented point cloud frame, thereby improving the ability of the machine learned model 224 to distinguish between the two object classes when re-trained using the augmented point cloud frame. The list of high-confusion additional object classes and their respective probabilities of occurrence may be referred to as occurrence information. Each high-confusion additional object class may be referred to as an additional target object class.

At 520, additional target object class acceptance information is generated. The policy generation subsystem 314 generates an object class combination list consisting of all subsets of the list $L = \{c, c_{FN_1}, c_{FN_2}, \ldots\}$ containing deficient object class c, such that each subset in the object class combination list consists of a combination of the deficient object class c and zero or more of its respective high-confusion additional object classes. The policy generation subsystem 314 assigns a desired acceptance probability $p_{accept}$ for each subset in the object class combination list, indicating a probability that point cloud object instance of the given combination of object classes should be injected into a point cloud frame. In some examples, $p_{occurrence}$ for each high-confusion additional object class in the combination may be used to generate the desired acceptance probability $p_{accept}$, for example by multiplying the values of $p_{occurrence}$ for each high-confusion additional object class in the combination. In other examples, the desired acceptance probability may be generated based on the accuracy (e.g., mIoU) of each high-confusion additional object class. The lower the mIoU for each high-confusion additional object class, the higher the acceptance probability; this can be represented as:

$$p_{accept} \propto G(mLoU_{c1}, mIoU_{c2}, \ldots)$$

wherein $G(.)$ is an arbitrary function, such as:

$$G(a, b, c) = \frac{((1-a) + (1-b) + (1-c))}{3}$$

wherein a, b, and c are the mIoU values for each high-confusion additional object class and are numbers between 0 and 1.

Thus, the lower the mIoU of a given high-confusion additional object class, the greater significance it may have in computing the desired acceptance probability of the object class combination. If each object class in a given combination is predicted by the machine learned model 224 with a low accuracy (i.e. low mIoU), more point cloud frames may be augmented by injecting point cloud object instance of the given combination. The object class combination list, and each combination's respective desired acceptance probability $p_{accept}$, may be referred to as additional target object class acceptance information.

Returning to FIG. 4, after policy generation step 412 the method 400 continues to a sample selection step 420. At 420, a sample selection subsystem 316 applies the primary policy 222 to the point cloud dataset 210 to select one or more point cloud frames from the point cloud dataset 210 for augmentation. Step 420 includes sub-steps 422 and 424.

At 422, the sample selection subsystem 316 identifies a target point cloud frame 226 of the plurality of point cloud frames 212 for data augmentation. In some embodiments, step 422 may be performed by applying the target frame sub-policy to the plurality of point cloud frames 212, or a subset of the plurality of point cloud frames 212, to select one or more target point cloud frames 226. In some examples, all point cloud frames 212 may be used to identify a target point cloud frame 226 for data augmentation, whereas in other examples only a subset of the point cloud frames 212 may be used to identify a target point cloud frame 226 for data augmentation. For example, some embodiments may perform the method 400 in alternating passes, with half of the point cloud frames 212 being considered for data augmentation, the augmented point cloud frames being used to re-train the machine learned model 224, and then the process being repeated with the other half of the point cloud frames 212. It will be appreciated that other approaches may be used to consider only a subset of the point cloud frames 212 for data augmentation in any given iteration of the method 400.

For each point cloud frame being considered for data augmentation, a sequence of operations is performed to apply the primary policy 222 to identify a target point cloud frame 226 for data augmentation. First, the target object sub-policy $\pi_1$ is consulted to determine which deficient object classes are identified by the primary policy 222. The following operations of step 422 are then performed for each deficient object class c, with respect to the current frame under consideration.

For each deficient object class c, the target frame sub-policy $\pi_2$ is consulted to determine whether a point cloud object instance of the current deficient object class should be injected into the current point cloud frame 226. If the scene condition $cond_c$ is false for the current deficient object class and the current point cloud frame (e.g., based on the scene type label 140 of the current point cloud frame, or for every scene type within the current point cloud frame), then next deficient object class is considered. However, if the scene condition $cond_c$ is true for the current deficient object class and the current point cloud frame, then the probability of injection $p_{inject,c}$ and range $R_c$ are considered to determine whether a point cloud object instance of the current deficient object class should be injected into the current point cloud frame. For example, a random or pseudo-random number generator may generate a random value between 0 and 1 for comparison to the probability of injection $p_{inject,c}$ to determine whether the injection of the point cloud object instance of the current deficient object class into the current point cloud frame should proceed, after which the range $R_c$ is compared to the spatial characteristics of the current point cloud frame and/or its component scenes to determine whether the current point cloud frame contains a location where a point cloud object instance of the current deficient object class can be injected. If all three injection conditions are satisfied (i.e. scene condition $cond_c$, probability of injection $p_{inject,c}$, and range $R_c$), then the sample selection subsystem 316 designates the current point cloud frame as a target point cloud frame 226 and the current deficient object class as a target object class. A point cloud object instance of the target object class (i.e. a target point cloud object instance 228) is identified at step 424 below.

Before proceeding to step 424, however, the sample selection subsystem 316 applies the additional target objects sub-policy $\pi_3$ to identify any additional object classes that should have point cloud object instances injected into the target point cloud frame 226 along with the target object class identified above. The sample selection subsystem 316 applies the additional target objects sub-policy to determine whether any subset (i.e. object class combination) of list L can be used to inject a point cloud object instance into the current point cloud frame, with reference to the same injection conditions described above. For example, for a first object class combination consisting of the deficient object class c (i.e. the target object class) and a single high-confusion additional object class $c_{FN_1}$, the injection conditions (i.e. scene condition $cond_c$, probability of injection $p_{inject,c}$, and range $R_c$) are checked for the high-confusion additional object class $c_{FN_1}$. If those injection conditions are satisfied, then the desired acceptance probability for combination $\{c, c_{FN_1}\}$ is checked (e.g. using a random number generator as described above), and if the desired acceptance probability is satisfied the method 400 proceeds to step 424 to identify point cloud object instances for both classes $\{c, c_{FN_1}\}$ for injection into the current point cloud frame; the object class combination selected for injection may be referred to as the selected object class combination. Otherwise, the next combination of object classes is considered for joint injection. If no combination of object classes is satisfied other than the deficient object class c, then the method 400 proceeds to step 424 to identify only a point cloud object instance of the deficient object class c for injection.

In some examples, the method 400 may determine at step 422 that multiple different point cloud object instances of object class combinations should be injected into a single point cloud frame, thereby generating multiple augmented point cloud frames. For example, if all conditions are satisfied for deficient object class c, for a first object class combination $\{c, c_{FN_1}\}$, and for a second object class combination $\{c, c_{FN_2}\}$, then three branches of the remaining steps of method 400 may be performed with respect to three different injection operations, thereby generating three different augmented point cloud frames.

At 424, the sample selection subsystem 316 identifies one or more target point cloud object instances 228 selected from the plurality of labeled point cloud object instances 214. Each target point cloud object instance 228 is a labeled point cloud object instance 214 labeled with one of the object classes included in the selected object class combination at step 422. Thus, one of the target point cloud object instances 228 is label with the deficient object class c, and in some examples additional target point cloud object instances 228 may be labeled with a high-confusion additional object class included in the selected object class combination (e.g., $c_{FN_1}$).

Target point cloud object instances 228 may be identified using any suitable technique, e.g. random selection of any labeled point cloud object instance 214 having the correct object class label. In some embodiments, other sources may be used for selection of the target point cloud object instance 228, such as additional point cloud datasets specified by a user of the system 200, simulated datasets, etc.

At step 426, a transformation subsystem 318 transforms each target point cloud object instance 228 using secondary policies. The transformation subsystem 318 uses several different types of information from other subsystems or other sources to determine what transformations (i.e. what secondary policies) should be applied to each target point cloud object instance 228, and using what values for various augmentation parameters. This information may include: the object class of each target point cloud object instance 228; the range $R_c$ of each such object class; the scene type into which each target point cloud object instance 228 will be injected within the target point cloud frame 226; the other object classes included in the selected object class combination; and the desired acceptance probability of the selected object class combination. This information may be used by the transformation subsystem 318 to set augmentation parameters and apply secondary policies in accordance with known techniques for data augmentation of point cloud frames. The secondary policies are applied to each target point cloud object instance 228 to generate, for each target point cloud object instance 228, a corresponding transformed point cloud object instance 232.

At 428, each transformed point cloud object instance 232 is injected into the target point cloud frame 226 to generate an augmented point cloud frame 230 using known techniques for point cloud data augmentation.

After the augmented point cloud frame 230 has been generated at step 428, the method 400 may return to step 420 to perform one or more iterations of steps 420 through 428 to generate one or more additional augmented point cloud frames 230, using either the current target point cloud frame 226 or another target point cloud frame. For example, the sample selection subsystem 316 may continue to cycle through the deficient object classes by consulting the target object sub-policy of the primary policy 222, the point cloud frames 212 by consulting the target frame sub-policy, and the object class combinations by consulting the additional target objects sub-policy, until all deficient object classes, frames, and object class combinations have been considered for injection and used to generate augmented point cloud frames 230 as appropriate.

At 430, the machine learned model 224 is retrained using the augmented point cloud frame(s) 230. In some embodiments, each augmented point cloud frame 230 is used to retrain the machine learned model 224 as it is generated. In other embodiments, the entire primary policy is applied to generate multiple augmented point cloud frames 230 before the generated set of augmented point cloud frames 230 is used to retrain the machine learned model 224. In some embodiments, the augmented point cloud frames 230 are added to the point cloud dataset 210 to form an augmented labeled dataset, and the augmented labeled point cloud dataset is used to retrain (or further train) the machine learned model 224.

After step 430, the method 400 may return to step 404 one or more times to identify inaccuracies of the now-retrained machine learned model 224 and generate further augmented point cloud frames to address these remaining inaccuracies. In some embodiments, the method 400 may return instead to step 402 to re-generate the scene dictionary 306 before performing the confusion analysis; however, in the embodiments described herein this is unnecessary, because the augmented point cloud frames 230 are generated in accordance with the scene dictionary 306 and therefore would not alter the contents of the scene dictionary 306 even after the augmented point cloud frames 230 are added to the point cloud dataset 210.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for augmenting a point cloud dataset comprising a plurality of point cloud frames and a plurality of labeled point cloud object instances, the method comprising:
obtaining prediction accuracy information of a machine learned model trained to perform a prediction task using the point cloud dataset, the prediction accuracy information indicating:
an accuracy of the predictions generated by the trained machine learned model; and
a deficient object class;
obtaining a scene dictionary based on the plurality of point cloud frames and a plurality of labels of the plurality of labeled point cloud object instances;
processing the prediction accuracy information and the scene dictionary to generate a primary policy;
applying the primary policy to the point cloud dataset to identify:
a target point cloud frame of the plurality of point cloud frames; and
a target point cloud object instance selected from the plurality of labeled point cloud object instances, the target point cloud object instance being labeled with the deficient object class; and generating an augmented point cloud frame by injecting the target point cloud object instance into the target point cloud frame.

2. The method of claim 1, wherein the plurality of point cloud frames comprise the plurality of labeled point cloud object instances.

3. The method of claim 1, wherein obtaining the prediction accuracy information comprises:
obtaining a plurality of ground truth object class labels of inputs to the machine learned model; and
determining, for each ground truth object class label of the plurality of ground truth object class labels, a distribution of predicted object class labels of the predictions,
the prediction accuracy information comprising the distribution of predicted object class labels for each ground truth object class label.

4. The method of claim 3, wherein:
the prediction accuracy information comprises at least one confusion matrix indicating the distribution of predicted object class labels for at least one ground truth object class label of the plurality of ground truth object class labels.

5. The method of claim 3, wherein obtaining the prediction accuracy information further comprises:
identifying the deficient object class based on the distribution of predicted object class labels for a ground truth object class label corresponding to the deficient object class; and
generating a class specific confusion matrix for the deficient object class, comprising the distribution of predicted object class labels for the ground truth object class label corresponding to the deficient object class.

6. The method of claim 1, wherein:
the primary policy further indicates a second deficient object class;
applying the primary policy further identifies a second target point cloud object instance selected from the plurality of labeled point cloud object instances, the second target point cloud object instance being labeled with the second deficient object class; and
generating the augmented point cloud frame comprises injecting the target point cloud object instance and the second target point cloud object instance into the target point cloud frame.

7. The method of claim 1, wherein injecting the target point cloud object instance into the target point cloud frame comprises:
using the primary policy to identify a location in the target point cloud frame; and
injecting the target point cloud object instance into the target point cloud frame at the location.

8. The method of claim 1, wherein injecting the target point cloud object instance into the target point cloud frame comprises:
using one or more secondary policies to transform the target point cloud object instance to generate a transformed point cloud object instance; and
injecting the transformed point cloud object instance into the target point cloud frame.

9. The method of claim 5, wherein:
processing the prediction accuracy information and the scene dictionary to generate the primary policy comprises processing the class specific confusion matrix and the scene dictionary to generate the primary policy wherein:
the primary policy indicates a plurality of deficient object classes; and
the primary policy comprises, for each deficient object class of the plurality of deficient object classes, injection conditions under which a point cloud object instance of the deficient object class should be injected into a given point cloud frame; and
applying the primary policy to the point cloud dataset to identify the target point cloud frame comprises determining whether the target point cloud frame satisfies the injection conditions of the primary policy with respect to the target object class.

10. The method of claim 9, further comprising, after generating the augmented point cloud frame, using the augmented point cloud frame to further train the machine learned model.

11. The method of claim 10, further comprising, after using the augmented point cloud frame to further train the machine learned model, repeating one or more times the steps of obtaining the prediction accuracy information, generating the primary policy, identifying the target point cloud frame, identifying the target object instance, generating the augmented point cloud frame, and further training the machine learned model.

12. A system for augmenting point cloud dataset, comprising a plurality of point cloud frames and a plurality of labeled point cloud object instances, the system comprising:
a processor device; and
a memory storing machine-executable instructions thereon which, when executed by the processor device, cause the system to:
obtain prediction accuracy information of a machine learned model trained to perform a prediction task using the point cloud dataset, the prediction accuracy information indicating: an accuracy of the predictions generated by the trained machine learned model; and
a deficient object class;
obtain a scene dictionary based on the plurality of point cloud frames and a plurality of labels of the plurality of labeled point cloud object instances;
process the prediction accuracy information and the scene dictionary to generate a primary policy;
apply the primary policy to the point cloud dataset to identify:
a target point cloud frame of the plurality of point cloud frames; and
a target point cloud object instance selected from the plurality of labeled point cloud object instances, the target point cloud object instance being labeled with the deficient object class; and
generate an augmented point cloud frame by injecting the target point cloud object instance into the target point cloud frame.

13. The system of claim 12, wherein the plurality of point cloud frames comprise the plurality of labeled point cloud object instances.

14. The system of claim 12, wherein obtaining the prediction accuracy information comprises:
obtaining a plurality of ground truth object class labels of inputs to the machine learned model; and
determining, for each ground truth object class label of the plurality of ground truth object class labels, a distribution of predicted object class labels of the predictions,
the prediction accuracy information comprising the distribution of predicted object class labels for each ground truth object class label.

15. The system of claim 14, wherein obtaining the prediction accuracy information further comprises:

identifying the deficient object class based on the distribution of predicted object class labels for a ground truth object class label corresponding to the deficient object class; and generating a class specific confusion matrix for the deficient object class, comprising the distribution of predicted object class labels for the ground truth object class label corresponding to the deficient object class.

16. The system of claim 12, wherein injecting the target point cloud object instance into the target point cloud frame comprises:

using the primary policy to identify a location in the target point cloud frame;

using one or more secondary policies to transform the target point cloud object instance to generate a transformed point cloud object instance; and injecting the transformed point cloud object instance into the target point cloud frame at the location.

17. The system of claim 15, wherein:

processing the prediction accuracy information and the scene dictionary to generate the primary policy comprises processing the class specific confusion matrix and the scene dictionary to generate the primary policy wherein:

the primary policy indicates a plurality of deficient object classes; and the primary policy comprises, for each deficient object class of the plurality of deficient object classes, injection conditions under which a point cloud object instance of the deficient object class should be injected into a given point cloud frame; and applying the primary policy to the point cloud dataset to identify the target point cloud frame comprises determining whether the target point cloud frame satisfies the injection conditions of the primary policy with respect to the target object class.

18. The system of claim 17, wherein the machine-executable instructions, when executed by the processor device, further cause the system to, after generating the augmented point cloud frame:

use the augmented point cloud frame to train the machine learned model; and repeat one or more times the steps of obtaining the prediction accuracy information, generating the primary policy, identifying the target point cloud frame, identifying the target object instance, generating the augmented point cloud frame, and training the machine learned model.

19. A non-transitory processor-readable medium having stored thereon point cloud dataset comprising one or more augmented point cloud frames generated by the method of claim 1.

20. A non-transitory processor-readable medium having machine-executable instructions stored thereon which, when executed by a processor device of a device, cause the device to augment point cloud dataset, comprising a plurality of point cloud frames and a plurality of labeled point cloud object instances, by:

obtaining prediction accuracy information of a machine learned model trained to perform a prediction task using the point cloud dataset, the prediction accuracy information indicating:

an accuracy of the predictions generated by the trained machine learned model; and a deficient object class;

obtaining a scene dictionary based on the plurality of point cloud frames and a plurality of labels of the plurality of labeled point cloud object instances;

processing the prediction accuracy information and the scene dictionary to generate a primary policy;

applying the primary policy to the point cloud dataset to identify:

a target point cloud frame of the plurality of point cloud frames; and a target point cloud object instance selected from the plurality of labeled point cloud object instances, the target point cloud object instance being labeled with the deficient object class; and generating an augmented point cloud frame by injecting the target point cloud object instance into the target point cloud frame.

* * * * *